(12) United States Patent
Cray et al.

(10) Patent No.: US 9,208,807 B2
(45) Date of Patent: Dec. 8, 2015

(54) MOTOR POLARITY TESTING OF A DUAL STAGE ACTUATED DISK DRIVE HEAD SUSPENSION

(71) Applicant: Hutchinson Technology Incorporated, Hutchinson, MN (US)

(72) Inventors: Scott J. Cray, Winsted, MN (US); Kellin D. Geisler, Roseau, MN (US); Jeffrey E. Thomsen, Hutchinson, MN (US)

(73) Assignee: HUTCHINSON TECHNOLOGY INCORPORATED, Hutchinson, MN (US)

( * ) Notice: Subject to any disclaimer, the term of this patent is extended or adjusted under 35 U.S.C. 154(b) by 0 days.

(21) Appl. No.: 14/475,675

(22) Filed: Sep. 3, 2014

(65) Prior Publication Data

US 2015/0062748 A1    Mar. 5, 2015

Related U.S. Application Data

(60) Provisional application No. 61/873,192, filed on Sep. 3, 2013.

(51) Int. Cl.
*G11B 5/48* (2006.01)
*G11B 5/55* (2006.01)
*G11B 5/455* (2006.01)

(52) U.S. Cl.
CPC .............. *G11B 5/4873* (2013.01); *G11B 5/455* (2013.01); *G11B 5/482* (2013.01); *G11B 5/4826* (2013.01); *G11B 5/5552* (2013.01)

(58) Field of Classification Search
None
See application file for complete search history.

(56) References Cited

U.S. PATENT DOCUMENTS

| | | | |
|---|---|---|---|
| 5,764,444 A | 6/1998 | Imamura et al. | |
| 6,621,653 B1 | 9/2003 | Schirle | |
| 6,639,411 B1 * | 10/2003 | Thomsen | 324/537 |
| 6,861,854 B1 * | 3/2005 | Guo et al. | 324/727 |
| 6,870,377 B2 * | 3/2005 | Thomsen | 324/727 |
| 6,977,793 B2 * | 12/2005 | White et al. | 360/78.05 |
| 7,027,253 B1 * | 4/2006 | Sun et al. | 360/75 |
| 7,072,134 B1 * | 7/2006 | Hirano et al. | 360/55 |
| 7,075,748 B2 * | 7/2006 | White et al. | 360/78.05 |
| 7,079,338 B1 * | 7/2006 | Semba et al. | 360/75 |
| 7,079,339 B1 * | 7/2006 | Semba et al. | 360/75 |
| 7,106,552 B2 * | 9/2006 | Hirano et al. | 360/78.05 |
| 7,218,481 B1 | 5/2007 | Bennin et al. | |
| 7,440,236 B1 | 10/2008 | Bennin et al. | |
| 7,459,835 B1 | 12/2008 | Mei et al. | |
| 7,595,965 B1 | 9/2009 | Kulangara et al. | |

(Continued)

*Primary Examiner* — Wayne Young
*Assistant Examiner* — James L Habermehl
(74) *Attorney, Agent, or Firm* — Faegre Baker Daniels LLP

(57) ABSTRACT

Methods and apparatus concern testing a disk drive suspension. Testing includes moving a first portion of a suspension relative to a second portion. A pair of motors is mounted on the suspension. The testing further includes measuring an electrical signal that is intrinsically produced by the motors, combined in a circuit, in response to the relative movement. The testing further includes identifying a characteristic of the electrical signal and determining whether an orientation of one or both of the motors is reversed relative to an intended motor orientation based on the characteristic of the electrical signal. The testing can determine whether the orientation of both motors matches the intended motor orientation, whether the orientation of one motor is reversed in a same polarity condition, whether the orientations of both motors are reversed in a mutual reverse polarity condition, or whether the suspension has a mechanical or electrical defect.

22 Claims, 13 Drawing Sheets

(56) References Cited

U.S. PATENT DOCUMENTS

| | | |
|---|---|---|
| 7,940,490 B2 * | 5/2011 | Shelor ..................... 360/78.05 |
| 8,254,065 B2 | 8/2012 | Inoue et al. |
| 8,335,049 B1 * | 12/2012 | Liu et al. ................... 360/78.05 |
| 8,416,536 B2 | 4/2013 | Fuchino et al. |
| 8,467,144 B2 * | 6/2013 | Lim et al. ................... 360/78.05 |
| 8,547,657 B1 * | 10/2013 | Liu et al. ................... 360/78.05 |
| 8,570,688 B1 | 10/2013 | Hahn et al. |
| 8,593,764 B1 | 11/2013 | Tian et al. |
| 8,605,383 B1 * | 12/2013 | Wang et al. ..................... 360/75 |
| 8,717,713 B1 | 5/2014 | Bjorstrom et al. |
| 8,797,664 B1 * | 8/2014 | Guo et al. ..................... 360/75 |
| 8,902,538 B1 * | 12/2014 | Liu et al. ................... 360/78.05 |
| 2001/0038515 A1 | 11/2001 | Koganezawa et al. |
| 2010/0067151 A1 | 3/2010 | Okaware et al. |
| 2011/0228425 A1 | 9/2011 | Liu et al. |
| 2011/0242708 A1 | 10/2011 | Fuchino |
| 2012/0002329 A1 | 1/2012 | Shum et al. |

* cited by examiner

MOTOR POLARITY TESTING OF A DUAL STAGE ACTUATED DISK DRIVE HEAD SUSPENSION

CROSS-REFERENCE TO RELATED APPLICATION

This application claims the benefit of U.S. Provisional Application Ser. No. 61/873,192, filed on Sep. 3, 2013, which is incorporated herein by reference in its entirety for all purposes.

TECHNICAL FIELD

The present invention relates generally to suspensions for disk drives. In particular, the invention concerns testing of a dual stage actuated (DSA) suspension and associated components.

BACKGROUND OF THE INVENTION

Dual stage actuated (DSA) suspensions, also sometimes known as microactuated or second stage actuated suspensions, are generally known. Such head suspensions typically include a baseplate for attaching the head suspension to a disk drive actuator, a mounting region attached to the baseplate, a loadbeam attached or integral to the mounting region, and a flexure supported by the loadbeam for mounting a magnetic read/write head slider. The one or more microactuators are incorporated to accurately and quickly position the head slider over the desired track on the magnetic disk. Suspensions of these types are disclosed, for example, in U.S. Pat. No. 6,621,653 to Schirle, U.S. Pat. No. 7,595,965 to Kulangara, U.S. Patent Application Publication No. 2011/0228425 by Liu, and U.S. Patent Application Publication No. 2010/0067151 by Okawara. These references are incorporated herein by reference in their entireties for all purposes.

SUMMARY

Various embodiments concern methods for testing a disk drive suspension component on which at least one motor is mounted. Such embodiments can comprise moving a first portion of a suspension component relative to a second portion of the suspension component, measuring an electrical signal that is produced by at least one motor mounted on the suspension in response to the relative movement between the first portion and the second portion, identifying a characteristic of the electrical signal, and determining whether an orientation of any of the at least one motor is reversed relative to an intended motor orientation based on the characteristic of the electrical signal. The characteristic of the electrical signal can be a polarity of a deflection of the electrical signal resulting from the relative movement between the first portion and the second portion. Some methods can include comparing the characteristic of the deflection of the electrical signal to a predetermined pattern indicative of the intended motor orientation.

The at least one motor can comprise a pair of motors. In some methods concerning motor pairs, both motors of the pair can be determined to be properly mounted on the suspension component if the deflection is in a first direction, both motors of the pair can be determined to be in a mutual reverse polarity condition relative to the intended motor orientation if the deflection is in a second direction opposite the first direction, and the orientation of one motor of the pair can be determined to be reversed relative to the intended motor orientation if the magnitude of the deflection is less than a threshold. In some methods, moving the first portion relative to the second portion can comprise delivering a control signal to a vibration element that causes the relative movement, the orientation of the pair of motors can be determined to match the intended motor orientation if the phase offset is less than the threshold, the orientation of one motor of the pair can be determined to be reversed relative to the intended motor orientation if the phase offset is greater than the threshold, and the pair of motors can be determined to be in a mutual reverse polarity condition relative to the intended motor orientation if the phase offset is approximately 180 degrees.

Various embodiments concern systems for testing a disk drive suspension component on which at least one motor is mounted. Such embodiments can comprise a base comprising an attachment mechanism that is configured to fix a first portion of the suspension component to the base while a second portion of the suspension component is not fixed to the base, a device configured to cause the second portion to move relative to the first portion while the first portion is fixed to the base by the attachment mechanism, and circuitry. The circuitry can be configured to measure an electrical signal that is produced by the at least one motor in response to the relative movement between the first portion and the second portion, identify a characteristic of the electrical signal, determine whether an orientation of any of the at least one motor is reversed relative to an intended motor orientation based on the characteristic of the electrical signal, and generate an output indicating whether the at least one motor is properly mounted based on the determination of orientation reversal. The circuitry can be configured to implement any of the above method steps or other step referenced herein.

While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

Figure 1:
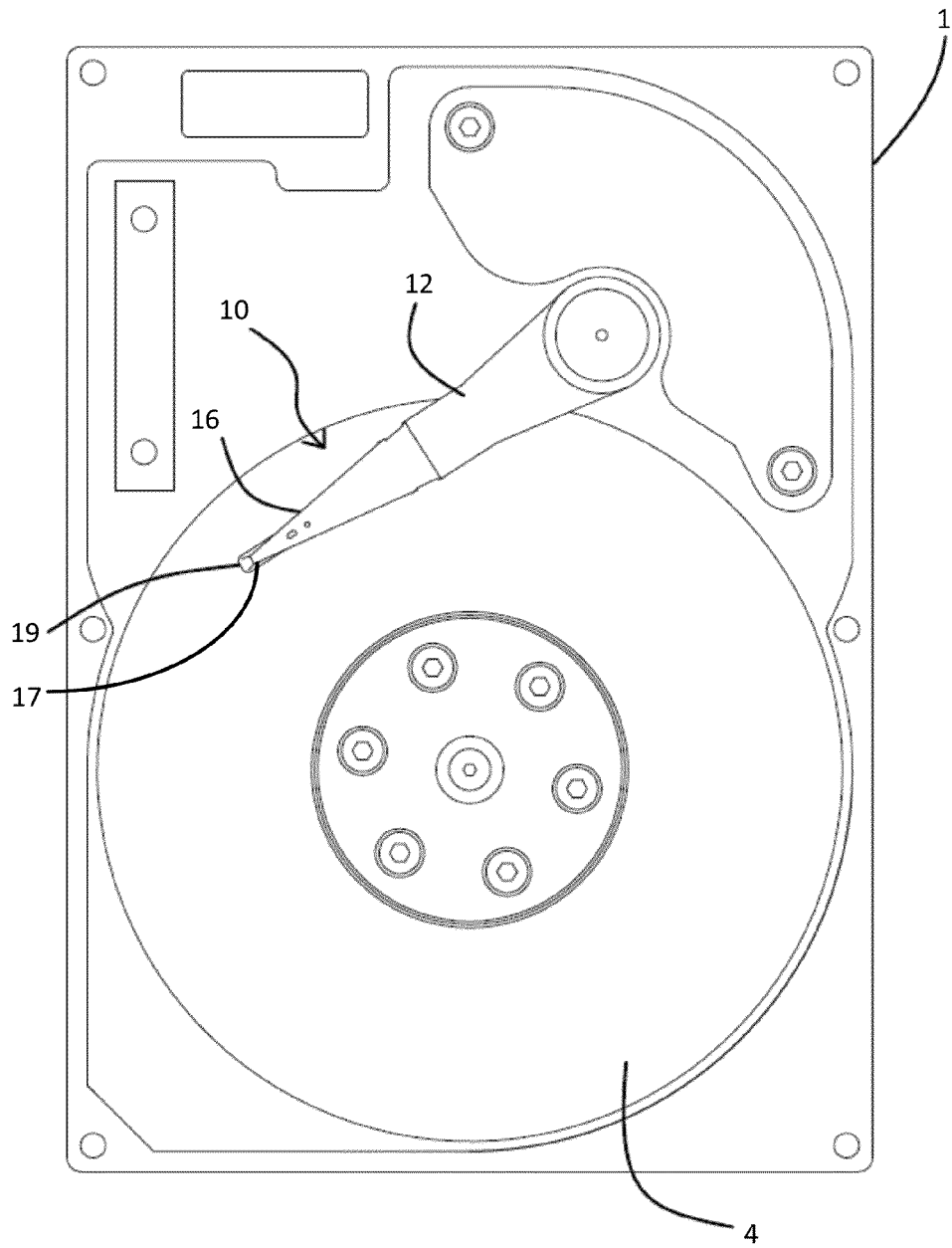
FIG. 1 is an overhead view of the interior of a disk drive.

While the subject matter of the invention is amenable to various modifications and alternative forms, specific embodiments have been shown by way of example in the drawings and are described in detail below. The intention, however, is not to limit the invention to the particular embodiments described. On the contrary, the invention is intended to include all modifications, equivalents, and alternatives falling within the scope of this disclosure as defined by the appended claims.

DESCRIPTION OF THE INVENTION

FIG. 1 is an overhead view of a disk drive 1. The disk drive 1 includes a suspension 10. The suspension 10 includes a baseplate 12, a loadbeam 16, a gimbal 17, and a head slider 19. The head slider 19 is mounted on the gimbal 17 and includes circuitry for magnetically writing data to, and reading data from, the disk 4.

Figures 2A, 2B:
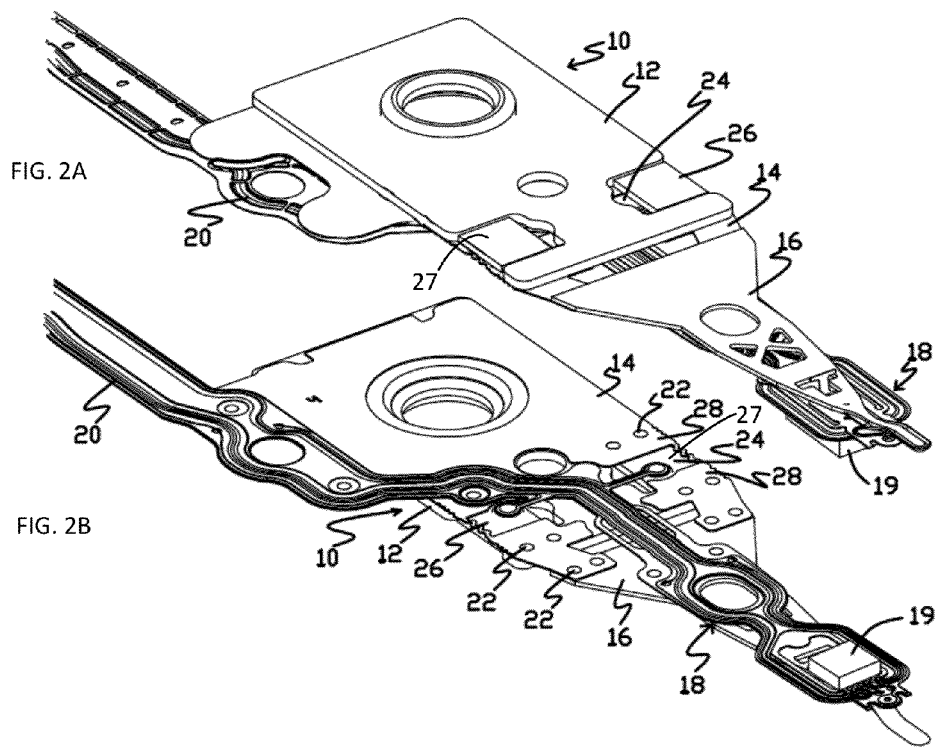
FIGS. 2A and 2B are isolated perspective views showing opposite sides of a suspension.

The suspension 10 is further shown in FIGS. 2A and 2B. The suspension 10 includes a hinge 14 or spring region and integrated lead flexure 18 with traces 20. The hinge 14 is mounted to hinge mounting portion of the baseplate 12 and extends from the distal end of the baseplate 12. The loadbeam 16 is mounted to the distal end of the hinge 14. The flexure 18 is mounted to the loadbeam 16, typically on the side of the loadbeam 16 mounted to the hinge 14. Weld spots 22 can be used to join these components. The baseplate 12, the hinge 14, and the loadbeam 16 can be formed from metal such as stainless steel. While these support components are discussed as separate elements, some or all of the baseplate 12, the hinge 14, and the loadbeam 16 can be formed from a single or multiple support elements. The flexure 18 can include a base layer of stainless steel. Copper or copper alloy traces 20 can extend along the flexure 18 and be separated from the stainless steel base layer by a layer of polyimide or other insulator.

The whole suspension 10 can be moved to scan the head slider 19 over a spinning disk 4 (shown in FIG. 1) by a head suspension actuation system that connects to the baseplate 12 as is known in the art. While movement of the whole suspension 10 by the head suspension actuation system provides relatively course position control of a head slider 19, a second stage actuation functionality of the illustrated suspension 10 is incorporated into the baseplate 12 to control finer sway adjustments. Microactuations along the suspension 10 produced by microactuating motors 26 and 27, as further described herein, can provide relatively fine positioning adjustment of the head slider 19. While two motors 26 and 27 are shown, a single motor can alternatively be provided on the suspension 10. As shown, the baseplate 12 has motor-receiving areas or openings 24. Motors 26 and 27 are received within the motor-receiving openings 24. The motors 26 and 27 are mounted to tabs 28 extending from the baseplate 12 into the motor-receiving openings 24, however other mounting options are possible. In the illustrated DSA suspension 10, the tabs 28 are portions of the hinge 14. In other embodiments (not shown), the tabs 28 to which the motors 26 and 27 are mounted can be other components such as a separate motor plate welded to the baseplate 12. While the motors 26 and 27 are shown mounted on the baseplate 12, the motors 26 and 27 can alternatively be mounted on the loadbeam 16 or on the flexure 18 as part of gimbal assembly in various other embodiments. In some other embodiments, the motors 26 and 27 can be mounted on the loadbeam 16. Epoxy or other adhesive is typically used to mount the motors 26 and 27 to the tabs 28 or other component.

The motors 26 comprise a generally planar element with a length (e.g., along a longitudinal axis) and a width. The motors 26 and 27 can be any suitable type of microactuator. For example, the motors 26 and 27 can each be a piezoelectric (PZT) microactuator, which may include a piezoelectric layer of lead zirconium titanate, polymers such as polyvinylidene fluoride (PVDF), or other piezoelectric or electrostrictive types of materials. As will be appreciated, each motor 26 and 27 includes polar terminals (not shown) for electrically coupling the motor 26 and 27 to a power supply.

DSA suspensions in accordance with this disclosure can be embodied in still other forms. For example, other DSA suspensions are described in U.S. Pat. No. 5,764,444 to Imamura, U.S. Patent Publication No. 2010/0067151 by Okawara, U.S. Patent Publication No. 2012/0002329 by Shum, and U.S. Patent Publication No. 2011/0242708 by Fuchino, each of which is incorporated herein by reference in its entirety and for all purposes.

Figure 3A:
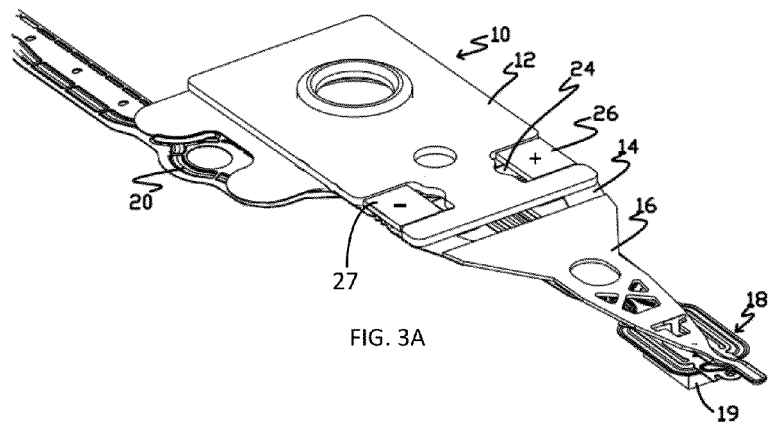
FIG. 3A is an isolated perspective view of a suspension having an exemplar intended motor orientation arrangement.
Figure 3B:
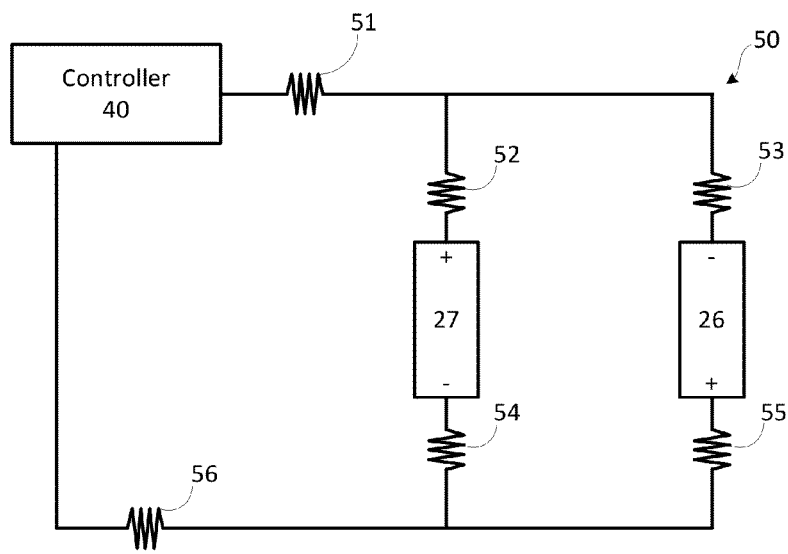
FIG. 3B is a circuit diagram corresponding to the suspension of FIG. 3A.

FIG. 3A illustrates an isolated perspective view of the top side of the suspension 10 while FIG. 3B illustrates a schematic diagram of the circuit 50 to which the motors 26 and 27 are connected. Each of the motors 26 and 27 includes an anode terminal on a first major side of the motor and a cathode terminal on the second major side of the motor opposite the first major side. The motors 26 and 27 are flipped with respect to each other. For example, motor 26 has an anode terminal (labeled with a "+" sign) facing upward in the top view of the suspension 10 of FIG. 3A while motor 27 has a cathode terminal (labeled with a "−" sign) facing upward in the top view of the suspension 10 of FIG. 3A. The polar terminals of the motors 26 and 27 can be located on different surfaces of the motors than shown herein, and necessarily on the major sides. A first portion of a circuit 50 (e.g., the first portion being a trace 20 of the flexure 18, including trace resistance 51 and bonding resistances 52-53) can electrically connect to the cathode terminal of the motor 26, and a second portion of the circuit 50 (e.g., the second portion being a base material of the suspension 10 such as the baseplate 12 or other conductor, and including bonding resistances 54-55 and base layer resistance 56) can be electrically connected to the anode terminal of the motor 26. The motors 26 and 27 are typically electrically connected, consistent with an intended motor orientation, in parallel and reversed in polarity with respect to each other, such that the anode terminal of motor 26 is electrically connected to the first portion of the circuit 50 (e.g., the same portion of the circuit 50 to which the cathode terminal of the motor 26 is electrically connected) while the cathode terminal of the motor 27 is electrically connected with the second portion of the circuit (e.g., the same portion of the circuit 50 to which the anode terminal of the motor 26 is electrically connected).

The motors 26 and 27 electrically activate to move a second portion of the suspension 10, such as a distal portion, relative to a first portion of the suspension 10, such as a proximal portion of the suspension 10. The distal portion can be any part of the suspension 10 that is distal of the motors 26 and 27 and which moves based on activation of the motors 26 and 27, and which can be part or all of any of the loadbeam 16, the flexure 18, the gimbal 17, and/or the slider 19. The proximal portion can be any part of the suspension 10 that is proximal of the motors 26 and 27, and which can be part or all of any of the baseplate 12 and the loadbeam 16.

A controller 40 can control the polarity of a signal sent through the circuit 50 to selectively apply a positive or negative voltage across the motors 26 and 27. For example, one pole of the signal can be applied to the cathode terminal of motor 26 and the anode terminal of motor 27 while the other pole of the signal can be applied to the cathode terminal of motor 27 and the anode terminal of motor 26, simultaneously. The controller 40 can be any control circuit of a disk drive which is configured to articulate a distal portion of a suspension by selectively activating one or more motors. The motors 26 and 27 are shown as electrical connected in parallel in the circuit 50, however other arrangements, such as being connected in series, are contemplated. Trace resistance 51 (e.g., of the traces 20), bonding resistances 52-55 (e.g., connecting the motors 26 and 27 with electrical conductors of the circuit 50), and base layer resistance 56 (e.g., the baseplate 12 as ground) can be present in the circuit 50.

The motors 26 and 27 selectively shorten and lengthen along their longitudinal axes upon electrical activation, the shortening or lengthening depending on the polarization of the voltage across the anode and cathode terminals. The activation of the motors 26 and 27 moves the distal portion of the suspension 10 relative to the proximal portion. Being that the motors 26 and 27 are electrically connected in parallel and reversed in polarity, one of the motors 26 and 27 will expand while the other of the motors 26 and 27 contracts when the same signal is simultaneously delivered to the motors 26 and 27, which sways the distal portion of the suspension 10 to move the slider 19 laterally. The polarity of the signal, and thereby the potential difference across the motors 26 and 27, can be reversed to move the distal portion of the suspension 10 in the other lateral direction. Such action, whereby one of the motors 26 and 27 pushes and the other pulls within the suspension 10, relies on the motors 26 and 27 being placed in the electrical circuit in an opposite polarity arrangement with respect to each other, and further relies on a particular motor (e.g., a right motor 26) having one polarity orientation (e.g., anode terminal facing up and connected with a first portion of an electrical circuit) and the other motor (e.g., the left motor 27) having the opposite polarity orientation (e.g., the cathode terminal facing up and connected with the first portion of an electrical circuit to receive the same signal as the anode terminal of the right motor 26). The mass scale production and the small size of the motors 26 and 27 means that a motor intended to be placed with the anode terminal and cathode terminals of one motor in a particular orientation may occasionally be misplaced such that the polarity is reversed (e.g., the anode terminal faces down while the cathode terminal faces up which is opposite the previous example). Furthermore, such misplacement can occur with either or both of the motors 26 and 27. The present disclosure concerns methods and systems for testing the polarity of the motors 26 and 27, as well as testing of the function of the motors 26 and 27, to ensure proper stroke direction and full stroke capability.

The embodiment of FIGS. 3A-B is considered to have the motors 26 and 27 properly placed in an intended motor orientation when the motor 26 of the left motor position has an anode terminal facing up (e.g., opposite the flexure 18) and a cathode terminal facing down (e.g., toward the flexure 18) and motor 27 of the right motor position has an cathode terminal facing up and an anode terminal facing down. It is noted that this intended motor orientation of the motors 26 and 27 may be consistent with the understanding of the program run by the controller 40 of the disk drive 1 in operating the motors 26 and 27. More specifically, if the controller 40 needs to sway the distal portion of the suspension 10 to the left, then a signal having a particular polarity can be applied across the circuit 50. Likewise, if the controller 40 needs to sway the distal portion of the suspension 10 to the right, then another signal having the opposite polarity can be applied across the circuit 50. If the polarity of either of the motors 26 and 27 is reversed such that one or both of the motors 26 and 27 are not in the intended motor orientation, then the distal portion of the suspension 10 would not sway in the intended direction and/or to the intended degree. The detection of such conditions is further discussed herein.

Figure 4A:
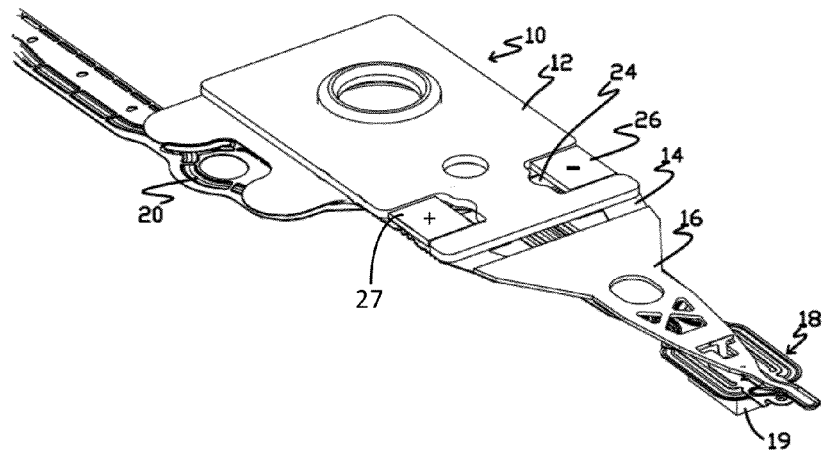
FIG. 4A is an isolated perspective view of a suspension having a particular motor orientation arrangement.
Figure 4B:
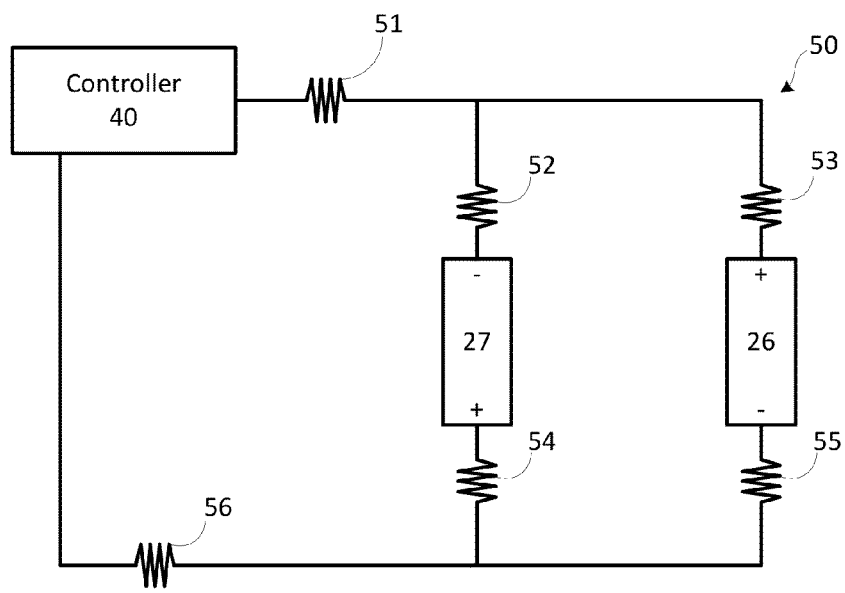
FIG. 4B is a circuit diagram corresponding to the suspension of FIG. 4A.

FIG. 4A illustrates an isolated perspective view of the top side of the suspension 10 while FIG. 4B illustrates the schematic diagram of the circuit 50 to which the motors 26 and 27 are connected. The arrangement of the motors 26 and 27 in FIGS. 4A-B is an example of mutual reverse motor polarity placement. Specifically, the example of FIG. 4A-B is considered to have the both of the motors 26 and 27 improperly placed in the motors positions. Motor 26 of the left motor position has a cathode terminal facing up and an anode terminal facing down which is the opposite of the intended orientation for that motor position (e.g., as compared to the arrangement of FIGS. 3A-B). Motor 27 of the right motor position has an anode terminal facing up and a cathode terminal facing down which is, again, the opposite of the intended orientation for that motor position (e.g., as compared to the arrangement of FIGS. 3A-B).

While an arrangement wherein one motor expands while the other contracts is the basic intended relationship for proper pulling and pushing function to sway the distal portion of the suspension 10 left or right, each of the motors 26 and 27 of the embodiment of FIGS. 4A-B is orientated to have the reverse polarity as intended such that when an electrical signal is applied across the motors 26 and 27 by the controller 40 which should cause the motors 26 and 27 to deflect the distal portion of the suspension 10 to the left will instead deflect the distal portion of the suspension 10 to the right and vice versa. Such an arrangement is considered an error and would lead to a malfunctioning suspension 10 and disk drive 1. The embodiment of FIGS. 4A-B is therefore referred to as a mutual reverse polarity condition as the orientation of each motor is reversed from the intended motor orientation. Testing to detect a reverse polarity condition is further discussed herein.

Figure 5A:
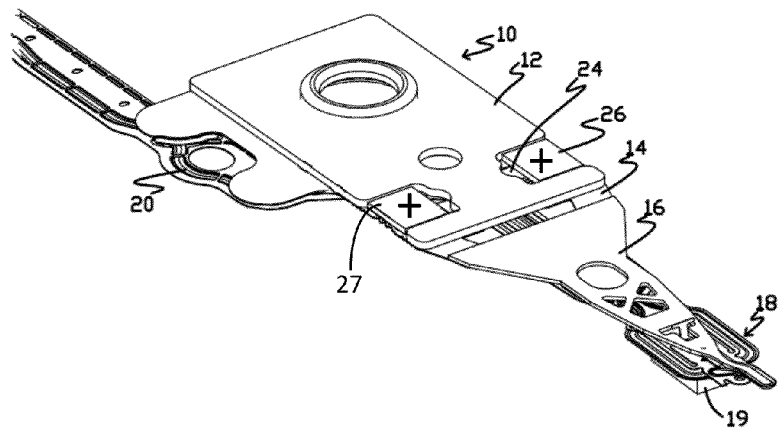
FIG. 5A is an isolated perspective view of a suspension having another particular motor orientation arrangement.
Figure 5B:
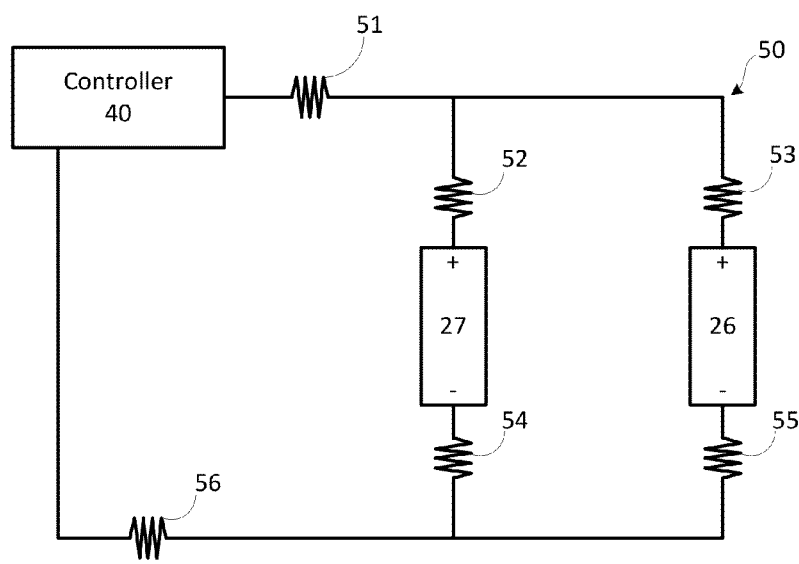
FIG. 5B is a circuit diagram corresponding to the suspension of FIG. 5A.

FIG. 5A illustrates an isolated perspective view of the top side of the suspension 10 while FIG. 5B illustrates the schematic diagram of the circuit 50 to which the motors 26 and 27 are connected. The arrangement of the motors 26 and 27 in FIGS. 5A-B is an example of same polarity condition. Specifically, the example of FIG. 5A-B is considered to have one of the motors 26 and 27 improperly placed in the motor positions such that the motors have the same polarity arrangement in the circuit 50. Motor 26 of the left motor position has an anode terminal facing up and a cathode terminal facing down which is the intended orientation for that motor position (e.g., as compared to the configuration of FIG. 3A). However, motor 27 of the right motor position has an anode terminal facing up and a cathode terminal facing down which is the opposite of the intended orientation for that motor position (e.g., as compared to the configuration of FIG. 3A). The motors 26 and 27 are orientated such that both motors will either contract or expand at the same time when electrically energized by the same control signal. The distal portion of the suspension 10 would not deflect in this case because the mechanical forces generated by the motors 26 and 27 would oppose and cancel each other. Such an arrangement is considered an error and would lead to a malfunctioning suspension 10 and disk drive 1. Testing to detect a same polarity condition is further discussed herein.

Figure 6A:
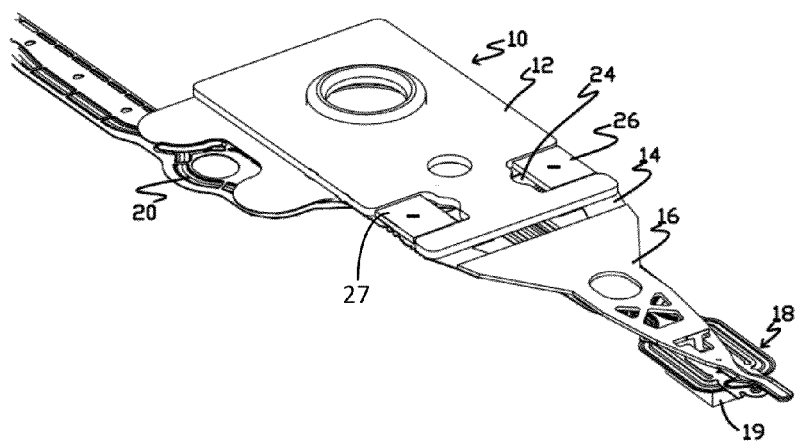
FIG. 6A is an isolated perspective view of a suspension having another particular motor orientation arrangement.
Figure 6B:
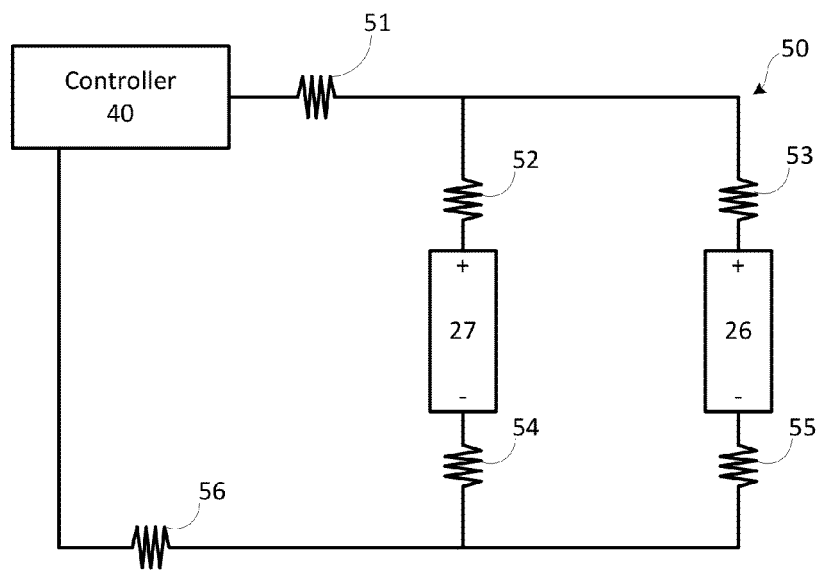
FIG. 6B is a circuit diagram corresponding to the suspension of FIG. 6A.

FIG. 6A illustrates an isolated perspective view of the top side of the suspension 10 while FIG. 6B illustrates the schematic diagram of the circuit 50 to which the motors 26 and 27 are connected. The arrangement of the motors 26 and 27 in FIGS. 6A-B is another example of same motor polarity placement. Specifically, the embodiment of FIG. 6A-B is considered to have the one of the motors 26 and 27 improperly placed in the motors positions such that the motors have the same polarity arrangement in the circuit 50. The motor 26 of the left motor position has an cathode terminal facing up and an anode terminal facing down which is the reverse of the intended orientation for this motor position (e.g., as compared to the configuration of FIG. 3A). The motors 26 and 27 are orientated such that both motors will either contract or expand at the same time when electrically energized in the circuit 50. The distal portion of the suspension 10 would not deflect in this case because the mechanical forces generated by the motors 26 and 27 would oppose and cancel each other.

Testing of proper motor placement can be performed by mechanically deflecting the suspension 10 and then sensing the electrical outputs from the motors 26 and 27. As mentioned previously, the motors 26 and 27 change shape when electrically activated. Likewise, the motors 26 and 27 output an intrinsically generated electrical signal when mechanically strained. Testing in accordance with the present disclosure concerns measuring a signal intrinsically generated and output by the motors 26 and 27 when the motors are mechanically stressed and analyzing the signal to determine whether the signal exhibits a pattern indicative of intended motor orientation, a mutual reverse polarity condition, a same polarity condition, or a low stroke condition, among other possibilities.

Figure 7:
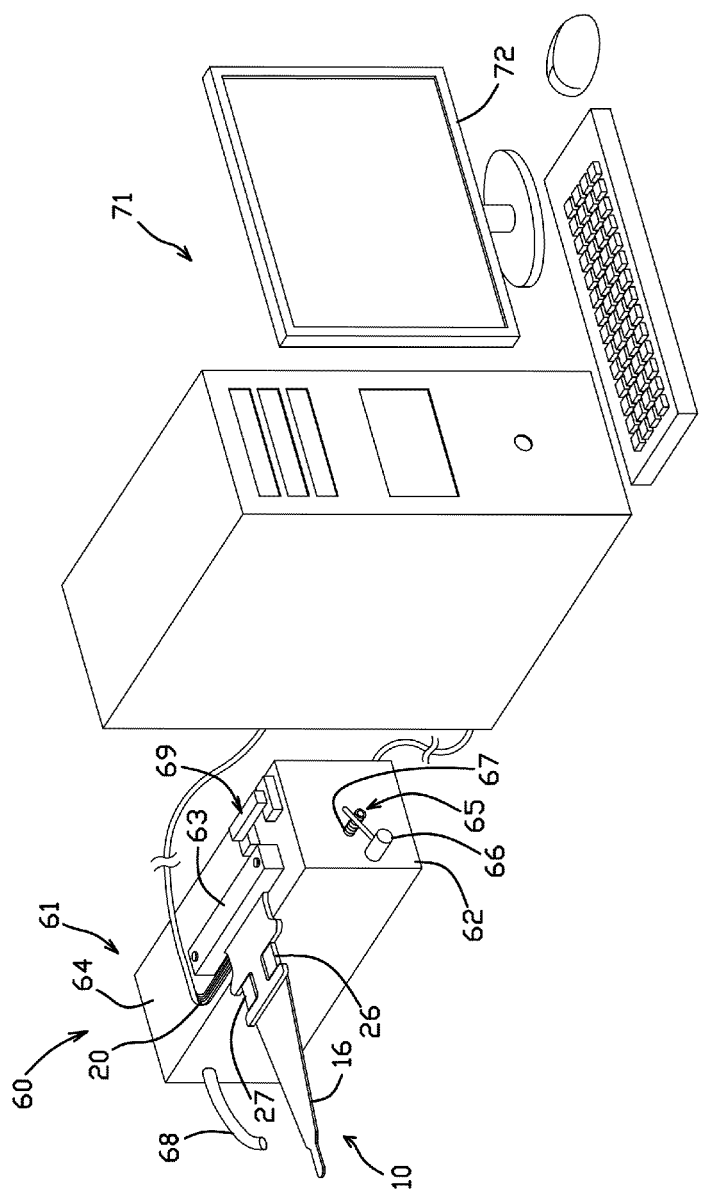
FIG. 7 is a perspective view of a testing system.

FIG. 7 is a perspective view of a testing system 60. The testing system 60 tests the orientation of the motors 26 and 27 on the suspension 10. The testing system 60 can be configured in various ways. The testing system 60 can include a measuring system 71. The measuring system 71 can be a computer.

In the embodiment of FIG. 7, the testing system 60 includes a mounting apparatus 61 which functions as a mount for the suspension 10. The mounting apparatus 61 includes a base 62. The base 62 can comprise a plate, a box, or other structuring in or on which the suspension 10 can be mounted. The base 62 can be, for example, made of metal. The base 62 can be substantially heavier than the suspension 10, such as heavier by an order of magnitude or more. The base can include a platform 64 on which the suspension 10 can be placed. The platform 64 can comprise a flat surface on which one side of the baseplate 12 of the suspension 10 can be placed against. The platform 64 can optionally include one or more features (e.g., recesses, projections) which can correspond to features of the baseplate 12. The baseplate 12 can mate with the features of the platform 64 to stabilize the baseplate 12 and prevent the baseplate 12 from moving on the platform 64.

The mounting apparatus 61 include a clamp 63 mounted on the base 62. The clamp 63 can comprise an upper jaw under which the baseplate 12 is placed. The clamp 63 can be moved downward to pinch the baseplate 12 between the platform 64 and the clamp 63. The baseplate 12 can thereby be temporarily fixed to the base 62 to prevent the baseplate 12 from moving relative to the base 62.

As shown in FIG. 7, the suspension 10 extends as a cantilever over and/or out from the base 62. In this way, a proximal portion of the suspension 10 (e.g., some or all of the baseplate 12) is fixed to the base 62 while a distal portion of the suspension 10 (e.g., the loadbeam 16) is not fixed to the base 62 and therefore can move relative to the base 62 and the proximal portion. The relative movement between the proximal portion (fixed to the base 62) and the distal portion (not fixed to the base 62) can correspond to the movement that the motors 26 and 27 are intended to cause when electrically activated.

The testing system 60 can include various devices for deflecting the distal portion of the suspension 10 relative to the proximal portion of the suspension 10 fixed to the base 62. As shown, an impactor 65 is mounted on the mounting apparatus 61. While the impactor 65 is shown as mounted on the base 62, the impactor 65 can be mounted on other parts of the testing system 60. The impactor 65 comprises a mallet 66 and a spring 67 that forces the mallet 66 against the mounting apparatus 61. The impactor 65 can additionally or alternatively be pneumatic. The impactor 65 provides a pulse force on the mounting apparatus 61, such as directly on the base 62. Vibration from an impact from the impactor 65 shakes the mounting apparatus 61, such vibration traveling along the cantilevered suspension 10 to move the distal portion relative to the proximal portion of the suspension 10, such as in a swaying motion.

As an alternative to or in addition to the impactor 65, the testing system 60 can comprise a pressured gas device that releases pressurized gas (e.g., a puff of air) that can gently apply the pulse force to the distal portion of the suspension 10, such as by impacting the loadbeam 16 with a release of gas. The pressured gas device can include a reservoir of pressurized gas and a valve (not shown) to control the release of the gas from the reservoir, the reservoir and the valve inside of the mounting apparatus 61. The pressured gas device can further include a conduit 68 for directing the release of the gas on a target such as the suspension 10. The release of gas on the distal portion of the suspension 10 (e.g., the loadbeam 16) deflects the distal portion relative to the anchored proximal portion of the suspension 10.

As an alternative to or in addition to the impactor 65 and/or pressured gas device, the testing system 60 can comprise a vibration element 69 connected to the mounting apparatus 61. The vibration element 69 may be a piezoelectric motor (e.g., similar to motors 26 and 27). A sinusoidal control signal can be applied to the vibration element 69 to cause the vibration element 69 to vibrate. The control signal can be supplied to the vibration element 69 by the measuring system 71. The vibration of the vibration element 69 is strong enough to vibrate the base 62 and the suspension 10 such that the distal portion of the suspension 10 moves relative to the proximal portion. Alternatively, the vibration element 69 can be placed in contact with the suspension 10.

The impactor 65, the pressured gas device, vibration element 69, and/or other device for articulating the suspension 10 can be controlled by the measuring system 71. For example, the timing of release of the impactor 65, the timing of release of air from the conduit 68, and/or the timing of vibration of the vibration element 69 can be automatically controlled by the measuring system 71. It is noted that it can be known by testing in which direction the pulse force initially deflects the distal portion of the suspension 10. For example, the pulse force can consistently cause the distal portion to initially sway to the right relative to the proximal portion of the suspension 10 and then sway to the left.

The traces 20 of the suspension 10 electrically connect with the motors 26 and 27. When in the testing system 60, the traces 20 can further be electrically connected to the measuring system 71. In some embodiments, electrical testing of the motors 26 and 27 can be accomplished with probes that contact the anode and cathode terminals of the motors 26 and 27 or other part of the electrical circuit of the motors 26 and 27. When attached to the traces 20 or other part of the electrical circuit of the motors 26 and 27, the measuring system 71 receives a signal generated by the motors 26 and 27 when the motors 26 and 27 are strained by the movement of the distal portion of the suspension 10 relative to the proximal portion. The signal is indicative of the movement of the motors 26 and 27. Also, the signal is indicative of the relative polar orientation of the motors 26 and 27 and the degree to which the motors 26 and 27 are strained, as further discussed herein. It will be understood that each of the motors 26 and 27 outputs a respective signal when strained but that the these signals are combined in the circuit 50 being that the motors 26 and 27 are electrically connected in parallel as shown herein. The signal output by the motors 26 and 27 is routed to the measuring system 71 for measurement (e.g., the voltage, and in particular the initial polarity of the signal).

Figure 8:
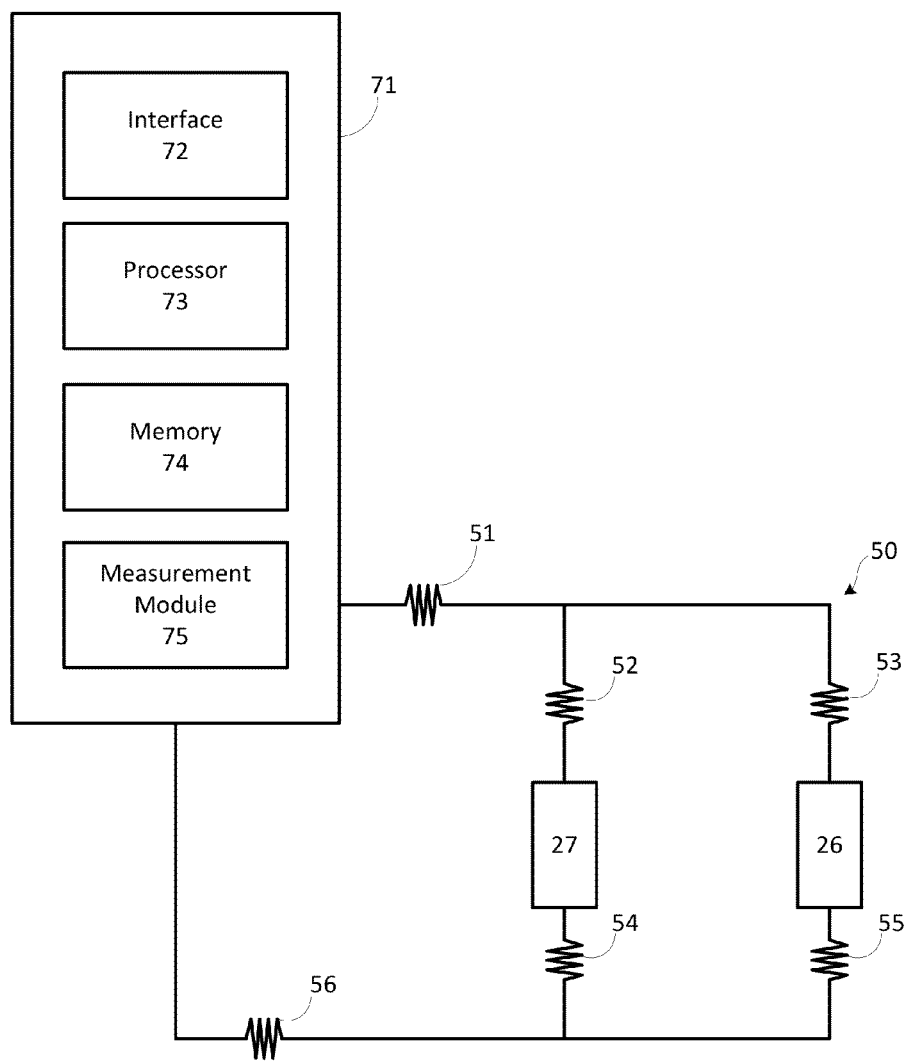
FIG. 8 is a schematic of a measuring system connected to a circuit for testing motor polarity.

FIG. 8 illustrates a schematic diagram of the measuring system 71 connected to the circuit 50 to which the motors 26 and 27 are connected. The measuring system 71 electrically connects with the circuit 50 to measure the signal from the motors 26 and 27. The measuring system 71 includes an interface 72 (e.g., a screen and a keyboard and/or other input), a processor 73, memory 74 configured to store data and/or program instructions executable by the processor 73, and a measurement module 75. The measurement module 75 can contain an amplifier and/or any other circuit component for measuring the signal output by the motors 26 and 27.

Figure 9:
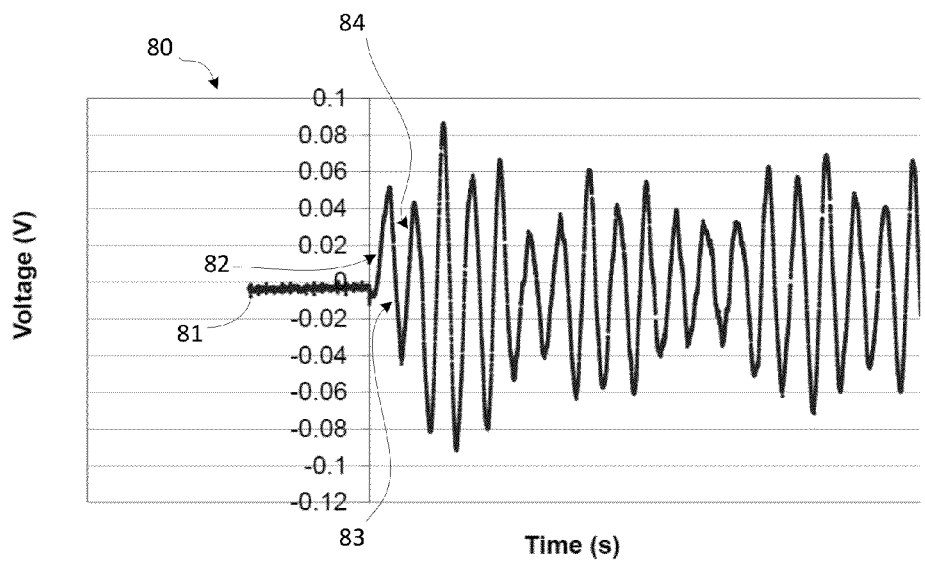
FIG. 9 is a plot of a motor output signal.

FIG. 9 shows a plot 80 of a collected signal 81. The signal 81 represents the combined voltage output by the motors 26 and 27 over a period of time in a setup similar to that shown in FIGS. 7 and 8. More specifically, the change in voltage of the signal 81 represents the oscillating voltage of the combined signal output from the motors 26 and 27 when the suspension 10 is deflected. The deflection of the suspension contracts a first motor of the pair of motors 26 and 27 while stretching the second motor of the pair of motors 26 and 27 when the distal portion of the suspension 10 deflects in one direction and then contracts the second motor while stretching the first motor when distal portion of the suspension 10 deflects in the other direction. Assuming that the motors 26 and 27 are arranged in the circuit to have opposite polarities, as shown in FIGS. 3A and 4A, the polarities of the signals output by the motors 26 and 27 will be the same and the magnitudes of the signals will add to produce a combined signal.

It is noted that the signal 81 includes a number of deflections, including a first deflection 82, a second deflection 83, and a third deflection 84. The direction, slope, derivative, and/or other characteristic of a deflection can be used to detect the polar orientations of the motors 26 and 27. Being that the lateral direction of the first deflection of the distal portion of the suspension 10 relative to the proximal portion is known (e.g., the pulse force is observed or otherwise known to cause the distal portion to sway left-ward relative to the proximal portion), then it is known which motor should compress and which motor should stretch, and it is therefore further known which motor should cause an initial positive or negative deflection of the signal 81. If the polar orientation of the motors matches the intended motor orientation, then the first deflection 82 (or subsequent second and third deflections 83, 84) will be in a predicted direction, positive or negative. The arrangement of the motors can be assessed based on whether the first deflection 82 (or another deflection) has a predicted polarity (e.g., as compared to a previous test of a suspension known to have the intended motor orientation) or whether the deflection deviates from the predicted polarity.

In some cases, a first test can be performed on a suspension having a known configuration that matches the intended motor orientation. For example, a suspension known to have a correct motor polarity arrangement can be tested to determine a baseline signal with initial, second, third, etc. deflection directions. Then subsequent suspensions can be tested to determine whether an initial, second, third, etc. deflection of the signal is in the same direction as the baseline signal. The signal 81 of FIG. 9 can represent such a baseline or standard for comparison.

Figure 10:
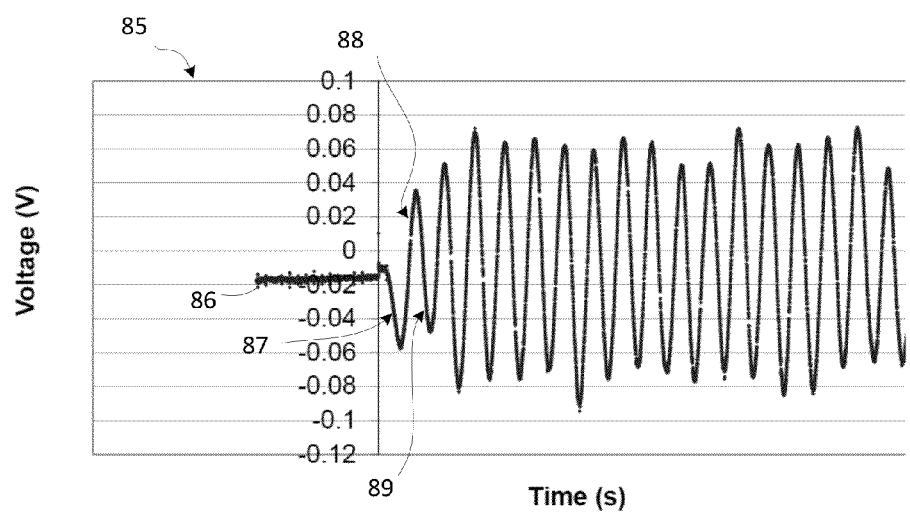
FIG. 10 is a plot of a motor output signal.

Assuming that the plot 80 of FIG. 9 represents the intended motor orientation, such as that of FIGS. 3A-B, then the plot 85 of FIG. 10 can represent a mutual reverse polarity motor condition, such as that of FIGS. 4A-B. In the example of FIGS. 4A-B, each of the motors 26 and 27 are reversed poled from the intended motor orientation and as such the relatively high amplitude and oscillatory pattern of the signal 86 of FIG. 10 may seemingly indicate a properly orientated arrangement. However, the first deflection 87 is negative and accordingly is in the opposite direction as the first deflection 82 of the signal 81 of FIG. 9. Likewise, the second deflection 88 and the third deflection 89 are respectively opposite that of the second deflection 83 and the third deflection 84 of the signal 81 of FIG. 9. One or more of the deflections can be used to determine whether the motors are in an opposite poled arrangement, such as the first deflection, the second deflection, the third deflection. It will be understood that the direction of the deflection, the slope of the deflection, the derivate of the deflection, or any other characteristic of the deflections can be used to determine the arrangement of the motors as discussed herein, such as by comparison to a baseline. As such, while the oscillating signal 86 may originally appear to represent a functioning suspension, the inconsistency between the corresponding deflections (e.g., first, second, third, etc.) relative to the baseline indicates that the tested suspension would sway in the opposite direction than intended when the motors 26 and 27 are electrically driven.

Figure 11:
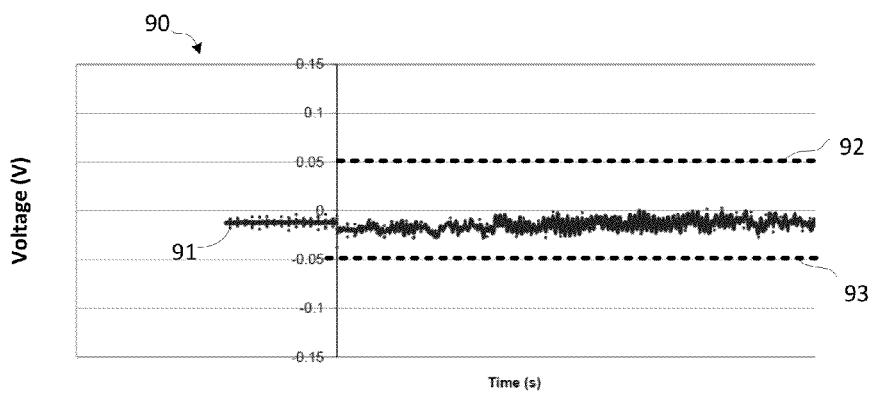
FIG. 11 is a plot of a motor output signal.

Assuming that the plot 80 of FIG. 9 represents the intended motor orientation, such as that of FIG. 3A, then the plot 90 of FIG. 11 represents a same polarity condition, such as that of FIGS. 5A-6B. In the embodiments of FIGS. 5A-6B, each of the motors 26 and 27 have anode terminals connected to the first portion of the circuit 50 while the cathode terminals are electrically connected to the second portion of the circuit 50. If the motors are arranged in the circuit to have the same polarity, then the simultaneous compacting of one motor and stretching of the other motor will have a canceling effect between the signals output by each motor such that the combined signal is relatively flat. The plot 90 of FIG. 11 demonstrates such a flat signal indicative of a same polarity condition.

In some embodiments, one or more thresholds can be used to distinguish between a same polarity condition characterized by a low amplitude or flat signal and an opposite polarity condition characterized by a high amplitude oscillating signal. FIG. 11 shows a first threshold 92 and a second threshold 93. It is noted that only one threshold may be used in some embodiments. If the signal 91 remains below a positive threshold (e.g., first threshold 92), above a negative threshold (e.g., second threshold 93), and/or or otherwise between the thresholds following a movement of the distal portion of the suspension 10 relative to the proximal portion, then an error condition can be confirmed. The error condition can be due to a same polarity condition wherein the suspension articulates and the motors 26 and 27 are stretched and compressed, however the respective signals from the motors 26 and 27 are of opposite polarity and accordingly cancel each other out to produce a combined flat signal. The error condition can alternatively be due to a mechanical issue that prevents the suspension from articulating. For example, a mechanical issue may be preventing a distal portion of the suspension from moving relative to the proximal portion. Such a condition may prevent the motors 26 and 27 from stretching or contracting to an intended extent such that the motors 26 and 27 do not output signals or the signals are of very low amplitude. The error condition may be due to an electrical issue that prevents proper propagation of signals. For example, an electrical defect may prevent a trace or electrical connector from transmitting an intrinsically generated signal from a motor or a control signal to a motor. If an intrinsic signal generated by the motor cannot be measured during testing or is measured to have low power, then a control signal may not be able to reach the motor during operation of the suspension 10. In some cases, one of the motors 26 and 27 may be damaged and not capable of outputting an electrical signal, which could be indicative of an inability for the motor to response appropriately to an input control signal by stretching or compacting as intended. Such conditions can be identified by determining whether the signal output by the motors 26 and 27 exceeds a threshold or is inside of a range as described above. Specifically, a signal that is below the threshold or is outside of the range indicates a malfunction while a signal that is above the threshold or is within the range indicates proper function and the absence of a defect.

Figure 12:
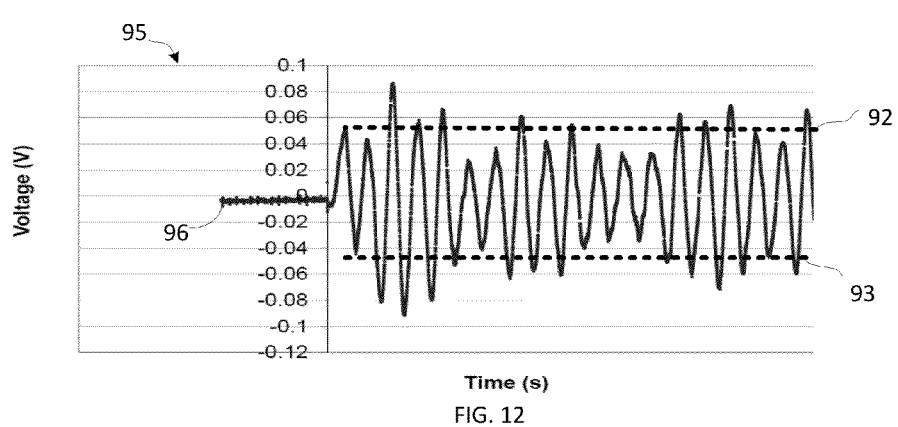
FIG. 12 is a plot of a motor output signal.

FIG. 12 illustrates a plot 95 wherein a signal 96 crosses each of the first threshold 92 and the second threshold 93. The signal 96 was collected in the same manner as the signal 81 in FIG. 9. Being that the signal 96 crosses both of the first threshold 92 and the second threshold 93, the suspension 10 can be determined to have adequate stroke in compacting and stretching the motors 26 and 27.

FIGS. 13-17 demonstrate examples of testing motor polarity by measuring a characteristic of the signal output from the motors 26 and 27 relative to a vibration control signal. Such techniques can employ the setup of FIGS. 7 and 8. In particular, a control signal can be delivered to the vibration element 69 such that the vibration element 69 vibrates the suspension 10, causing the motors 26 and 27 to generate an output signal in response to movement of the distal portion of the suspension 10 relative to the proximal portion as the motors 26 and 27 stretch and compress. The control signal can have a sinusoidal pattern, as shows in FIGS. 13-17, or other pattern.

Figure 13:
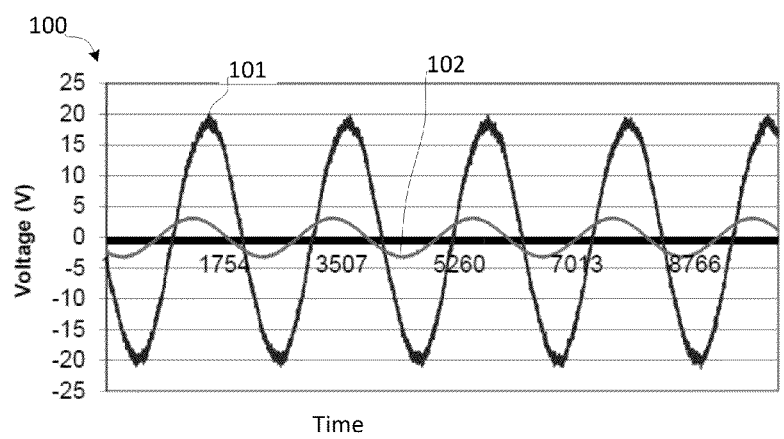
FIG. 13 is a plot showing a vibration control signal and a motor output signal.

FIG. 13 shows a plot 100 of voltage over time. The plot 100 shows a control signal 102 that is input into the vibration element 69 and a motor signal 101 that is output by the motors as the motors 26 and 27 stretch and compress in response to the vibration and the swaying of the suspension 10. It is noted that the control signal 102 cycles at 12 kilohertz. As shown, the suspension 10 also vibrates at the same frequency as the vibration element 69. Specifically, the motor signal 101 exhibits essentially the same frequency as the control signal 102.

The plot 100 of FIG. 13 is a baseline as the motors 26 and 27 were known in this setup to have the intended motor orientation (e.g., that of FIGS. 3A-B) when the data was generated. A characteristic of the control signal 102 and the motor signal 101 was measured for later comparison to assess motor orientation of subsequent embodiments. For example, the phase offset between the sinusoidal patterns of the control signal 102 and the motor signal 101 were measured. The phase offset can be measured by comparing the time difference between the cycles or phase angle peak-to-peak between the control signal 102 and the motor signal 101.

Figure 14:
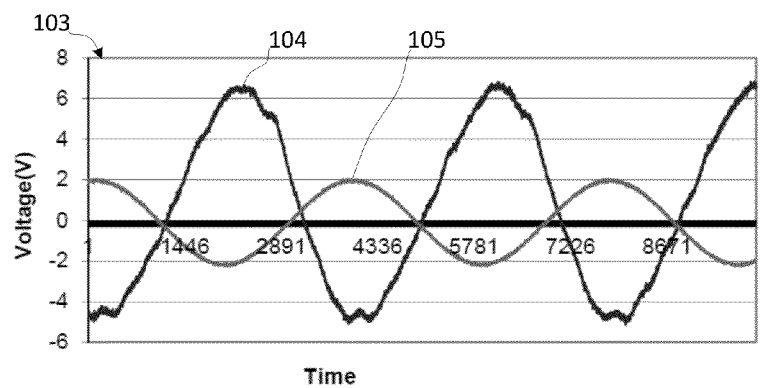
FIG. 14 is a plot showing a vibration control signal and a motor output signal.

The plot 103 of FIG. 14 represents a test of the motors in a suspension having a similar configuration as that tested in FIG. 13 but in this case the motors are in a mutual reverse polarity condition (e.g., as shown in FIGS. 4A-B). The control signal 105 can be the same as the control signal 102 of the baseline plot 100 (e.g., same frequency and amplitude). The motor signal 104 can be measured from the circuit 50 in the same manner as motor signal 104. As with the baseline plot 100, a characteristic of the control signal 102 and the motor signal 101 was measured for later comparison with the baseline characteristic. Specifically, the phase offset between the control signal 105 and the motor signal 104 was measured and compared to the phase offset of the baseline plot 100. The comparison between the phase offset of the baseline and the test embodiment indicates whether the motors 26 and 27 are in an intended orientation arrangement or a mutual reverse polarity condition. The motors are in an intended orientation arrangement if the phase offsets between the test and the baseline signals are the same or if the difference in phase offset between the test and the baseline signals is below a threshold (e.g., twenty degrees). As can be seen, the control signal 102 and the motor signal 101 of the baseline of FIG. 13 are substantially in phase while the control signal 105 and the motor signal 104 of the test of FIG. 14 are substantially out of phase. Based on this difference, it can be concluded that the plot 103 of FIG. 14 represents a mutual reverse polarity condition.

Figure 15:
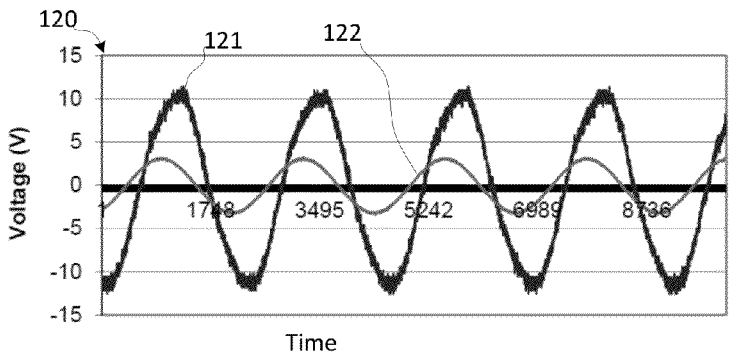
FIG. 15 is a plot showing a vibration control signal and a motor output signal.
Figure 16:
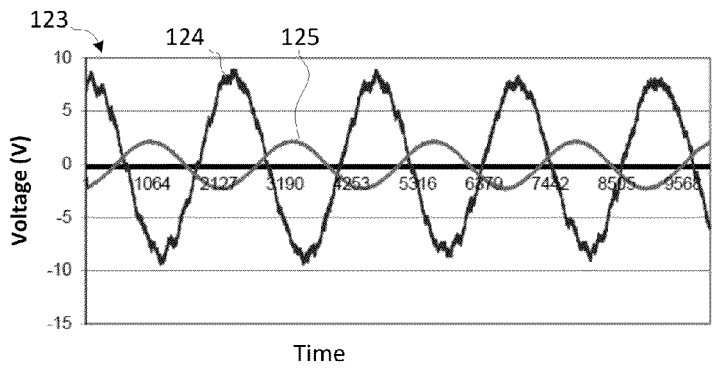
FIG. 16 is a plot showing a vibration control signal and a motor output signal.

FIG. 15 shows a baseline plot 120 of an embodiment with intended motor orientation (e.g., corresponding to that of FIGS. 3A-B). FIG. 16 shows a test plot 123 of an example with a mutual reverse polarity condition (e.g., corresponding to that of FIGS. 4A-B). The motor polarity arrangement associated with FIG. 16 can be detected using the technique described in association with FIGS. 13-14. However, the control signals 122 and 125 input to the vibration element have a frequency of 11 kilohertz. As demonstrated in plots 120, 123 of FIGS. 15 and 16, the suspension vibrates at 11 kilohertz based on the input control signal. Various frequencies were tested and it was found that the suspensions generally vibrated at the frequency of the input control signal such that that motors output a signal having the same frequency and a phase offset could be measured between the input and output signals to assess motor orientation arrangement.

Figure 17:
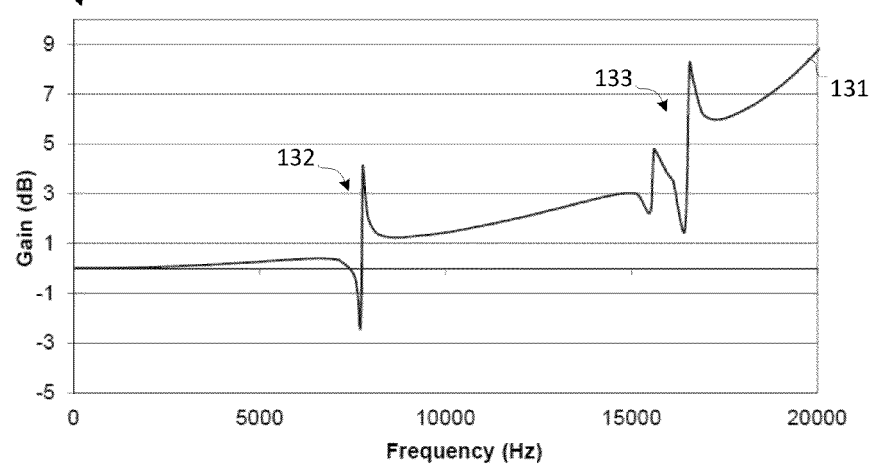
FIG. 17 is a gain plot for a computer modeled suspension.

FIG. 17 demonstrates a combined gain plot 130 generated from computer modeling of suspensions. The smooth portions of the gain data 131 represent frequencies at which suspensions would vibrate at the input frequency while the erratic portions 132 and 133 of the gain data 131 represent frequencies at which suspensions would not vibrate at the input frequency. As such, testing as described herein may preferably be performed at frequencies corresponding to the smooth portions of the gain data 141.

In some embodiments, the proper functioning of a suspension can be assessed based on a measurement of gain at one or more resonance modes. The resonance modes can correspond to the frequencies at which the suspension oscillates in a sway, yaw, torsion, or bend motion. A baseline gain profile can be established for a baseline suspension (e.g., the suspension 10) that is known to operate properly. The baseline suspension can be known to be free from mechanical and electrical defects and to have intended motor orientation. A baseline gain profile can be established by vibrating the baseline suspension (e.g., with the vibration element 69) with a control signal having known parameters. The control signal parameters can include signal frequency and amplitude. Typically, the baseline suspension will vibrate at a resonance mode in which the frequency of vibration of the suspension matches the frequency of the control signal. While the baseline suspension is vibrating at the resonance mode, a signal generated by the one or more motors (e.g., motors 26 and 27) on the baseline suspension is measured. The measuring of the signal generated by the one or more motors can be performed in any manner described herein. The signal generated by the one or more motors is indicative of the swaying motion of the baseline suspension because the swaying motion compacts and stretches the one or more motors, causing the one or more motors to generate a signal as described herein. The generated signal is then compared to the control signal. The comparison can include calculating the gain between the control signal and the signal generated by the one or more motors. The gain value can be calculated based on a ratio of the voltage of the signal generated by the one or more motors and the voltage of the control signal. This test can be repeated using a plurality of frequencies for the control signal. A gain value is calculated for each of the plurality of frequencies by comparing the control signal at each frequency to the signal generated by the one or more motors at each frequency to yield a plurality of gain values respectively corresponding to the plurality of frequencies. It is noted that the plurality of frequencies can be selected exclusively from amongst the frequencies at which the baseline suspension exhibits a stable vibration response (e.g., corresponding to the smooth portions of the gain data 131 of FIG. 17) while not including any frequency at which the baseline suspension exhibits an unstable vibration response (e.g., corresponding to the erratic portions 132 and 133 of the gain data 131 of FIG. 17). In some cases, the plurality of frequencies can be selected to include one or more frequencies at which the baseline suspension exhibits a stable vibration response and to include one or more frequencies at which the baseline suspension exhibits an unstable vibration response.

A plurality of thresholds can be determined based on the plurality of gain values. For example, each threshold can be set as a percentage of gain of a respective one of the plurality of gain values. In some cases, each threshold may be set as 90% or some other percentage of the gain value for the respective frequency to which the threshold corresponds (i.e. the frequency of the control signal/resonance mode from which the gain value was calculated). In some embodiments, gain ranges can be set at each of the plurality of frequencies based on the plurality of gain values. For example, each range may be set as +/−5% or some other percentage range of the gain value for the respective frequency to which the range corresponds (i.e. the frequency of the control signal/resonance mode from which the gain value was calculated).

The plurality of gain values determined as described above using the baseline suspension, such as in the form of a plurality of thresholds or ranges calculated based on the plurality of gain values, can be used to evaluate the functionality of other suspensions. The above described procedure for determining the plurality of gain values for the baseline suspension can be repeated using one or more test suspensions to determine a plurality of test gain values for each test suspension at the plurality of frequencies used when determining the plurality of gain values for the baseline suspension. For each test suspension, the plurality of test gain values can be compared to the plurality of gain values, respectively at the plurality frequencies, to determine whether the test suspension is performing similarly to the baseline suspension or exhibits evidence of a mechanical or electrical defect. For example, each of the plurality of test gain values can be compared to the respective threshold or range that corresponds to the same control signal/resonance mode frequency. If one, two, three, or some other threshold number of the plurality of test gain values are similar to the corresponding baseline gain, below its corresponding threshold or outside of its corresponding range (correspondence based on the same control signal/resonance mode frequency), then the test suspension can be determined to have some mechanical or electrical defect and the test suspension can be rejected and scrapped. Alternatively, if all of the plurality of test gain values, or some threshold number of test gain values, are respectively similar to the plurality of gain values, above the plurality of thresholds, or within the plurality of ranges, then it can be determined that the test suspension has similar mechanical and electrical function to the baseline suspension and does not have any mechanical or electrical defects.

While exemplar embodiments are discussed above which determine a plurality of gain values from the baseline suspension to determine a plurality of thresholds or ranges, which are then compared to a plurality of test gain values respectively across a plurality of corresponding frequencies, some embodiments may determine a single gain value from the baseline suspension at a frequency and/or determine only one threshold or range based on the one gain value. A single test gain value may be determined at the frequency for a test suspension. The only test gain value may then be compared to the single gain value or the single threshold or range. The assessment of whether the test suspension is functioning properly can be based on the comparison of the one test gain value to the single gain value or the single threshold or range. The test suspension can be rejected as malfunctioning if the one test gain value is dissimilar to the single gain value, below the signal threshold, or outside of the range. Alternatively, if the test gain value is similar to the single gain value, above the threshold, or within the range, then the test suspension can be determined to have similar mechanical and electrical function to the baseline suspension and to not have any mechanical or electrical defects.

The measuring system 71 can generate an output based on the results of a test to indicate whether a particular suspension is configured properly or has an unintended motor orientation arrangement. For example, if a tested suspension is confirmed to have an intended motor orientation, a mutual reverse polarity condition, or a same polarity condition, then an indication of the condition can be generated on the interface 72. A suspension can be removed or rejected in an automated manner from an assembly process if a condition of improper motor placement is detected while suspensions with proper motor placement and articulating function can pass such inspection.

It is noted that the testing described herein can be performed by mechanically activating the motors without electrically activating the motors. That is, a potential difference may not be applied across the terminals of the motors during testing. Rather, the electrical activity of the motors is intrinsically produced by the motors themselves in response to being compressed or stretched. As such, the motors need not be energized during testing. It is also noted that while two motor embodiments are presented herein, embodiments having other numbers of motors can instead be tested in the same manner as described herein for two motors. For example, a suspension having one motor can be tested to determine where a deflection of a distal portion of the suspension in a known direction relative to a proximal portion of the suspension compresses or stretches the motor to cause a signal measured across the motor to make an initial (or second, third, etc.) positive or negative deflection. The expected direction of deflection can be compared to the actual direction of deflection to determine whether the actual orientation of the motor matches the intended motor orientation or whether the orientation of the motor is reversed.

Figure 18:
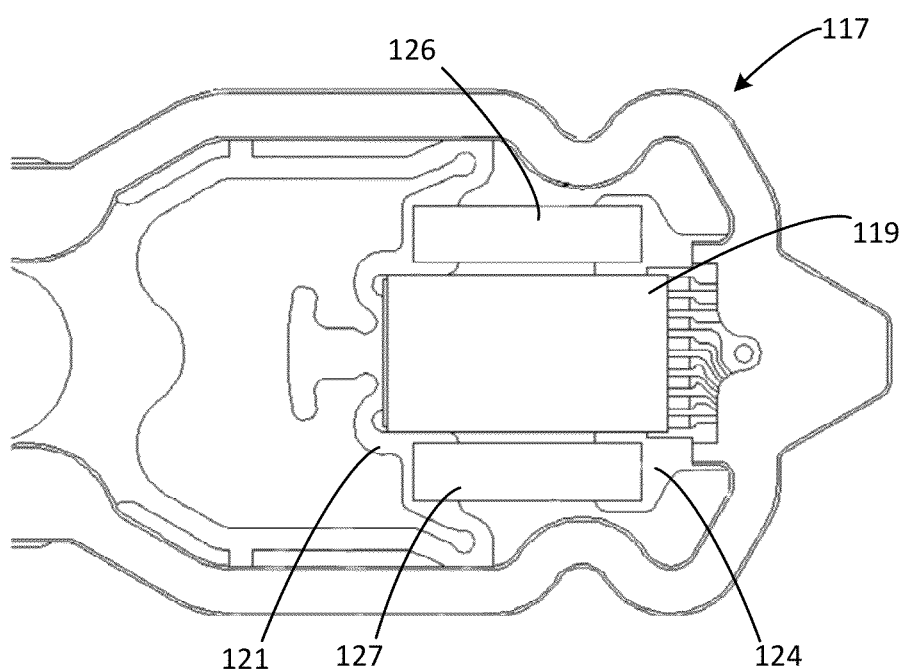
FIG. 18 is an isolated overhead view of a gimbal portion of a suspension.

While some embodiments presented herein show motors 26 and 27 mounted on a baseplate 12 of a suspension 10, various embodiments of the present disclosure are not so limited. As discussed herein, motors 26 and 27 can alternatively be located on the loadbeam 16 or on a gimbal 17. Testing apparatuses and methods for assessing the orientation of motors mounted on a loadbeam or a gimbal can be the same as presented herein for the motors 26 and 27 mounted on the baseplate 12. FIG. 18 shows an isolated overhead view of a gimbal 117 of a suspension. The suspension can correspond to the suspension 10 and the gimbal 117 can correspond to the gimbal 17 of FIGS. 1-3B, for example. A pair of motors 126, 127 is mounted on the gimbal 117. Electrical activation of the motors 126, 127 (e.g., causing expansion and contraction of the motors 126, 127) can move the distal portion 124 of the gimbal 117 relative to the proximal portion 121 of the gimbal 117 to track the head slider 119, mounted on the distal portion 124, over disk media. The intended motor orientation can be the same as that shown in FIG. 3A and can be tested in any way presented herein to determine whether the orientations of the motors 126 and 127 matches the intended orientations or whether, for example, the polarity of one or both motors 126 and 127 is reversed from the intended orientations in a mutual reverse polarity condition, same polarity condition, or other condition as described herein.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. A method for testing a disk drive suspension component on which at least one motor is mounted, the method comprising:
moving a first portion of a suspension component relative to a second portion of the suspension component, at least one motor mounted on the suspension component;
measuring an electrical signal that is produced by the at least one motor in response to the relative movement between the first portion and the second portion;
identifying a characteristic of the electrical signal; and
determining whether an orientation of any of the at least one motor is reversed relative to an intended motor orientation based on the characteristic of the electrical signal.

2. The method of claim 1, wherein the electrical signal exhibits an oscillatory pattern and the characteristic is a predetermined polarity of a part of the oscillatory pattern.

3. The method of claim 1, wherein the characteristic of the electrical signal is a polarity of a deflection of the electrical signal resulting from the relative movement between the first portion and the second portion.

4. The method of claim 3, further comprising comparing the characteristic of the deflection of the electrical signal to a predetermined pattern indicative of the intended motor orientation.

5. The method of claim 4, wherein:
the at least one motor is determined to match the intended motor orientation if the deflection is in a first direction, and
at least one of the at least one motor is determined to be reversed relative to the intended motor orientation if the deflection is in a second direction opposite the first direction.

6. The method of claim 4, wherein:
the at least one motor comprises a pair of motors,
both motors of the pair are determined to be properly mounted on the suspension component if the deflection is in a first direction, and
both motors of the pair are determined to be in a mutual reverse polarity condition relative to the intended motor orientation if the deflection is in a second direction opposite the first direction.

7. The method of claim 1, wherein:
the at least one motor comprises a pair of motors,
the characteristic of the electrical signal is a polarity of a deflection of the electrical signal that is a combined output by both motors of the pair, and
the orientation of one motor of the pair is determined to be reversed relative to the intended motor orientation if the magnitude of the deflection is less than a threshold.

8. The method of claim 1, wherein:
moving the first portion relative to the second portion comprises delivering a control signal to a vibration element that causes the relative movement, and
the characteristic of the electrical signal is a phase offset between the control signal and the electrical signal.

9. The method of claim 8, further comprising comparing the phase offset to a threshold, wherein the at least one motor comprises a pair of motors, the orientation of the pair of motors is determined to match the intended motor orientation if the phase offset is less than the threshold, and the orientation of one motor of the pair is determined to be reversed relative to the intended motor orientation if the phase offset is greater than the threshold.

10. The method of claim 8, wherein the at least one motor comprises a pair of motors, and the pair of motors are determined to be in a mutual reverse polarity condition relative to the intended motor orientation if the phase offset is approximately 180 degrees.

11. The method of claim 1, wherein moving the first portion relative to the second portion comprises one or more of introducing a mechanical impact, introducing a burst of air on the second portion, or delivering a control signal to a vibration element.

12. The method of claim 1, wherein:
moving the first portion relative to the second portion comprises delivering a control signal to a vibration element that causes the relative movement, and
the characteristic of the electrical signal is a gain calculated based on the control signal and the electrical signal.

13. The method of claim 1, wherein the first portion and the second portion are each part of a gimbal of the suspension component and the at least one motor is mounted on the gimbal.

14. A system for testing a disk drive suspension component on which at least one motor is mounted, the system comprising:
a base, the base comprising an attachment mechanism that is configured to fix a first portion of the suspension component to the base while a second portion of the suspension component is not fixed to the base;

a device configured to cause the second portion to move relative to the first portion while the first portion is fixed to the base by the attachment mechanism; and circuitry configured to:
- measure an electrical signal that is produced by the at least one motor in response to the relative movement between the first portion and the second portion;
- identify a characteristic of the electrical signal;
- determine whether an orientation of any of the at least one motor is reversed relative to an intended motor orientation based on the characteristic of the electrical signal; and
- generate an output indicating whether the at least one motor is properly mounted based on the determination of orientation reversal.

15. The system of claim 14, wherein the characteristic of the electrical signal is a polarity of a deflection of the electrical signal resulting from the relative movement between the first portion and the second portion.

16. The system of claim 15, wherein:
the circuitry is configured to determine that the orientation of the at least one motor matches the intended motor orientation if the deflection is in a first direction, and
the circuitry is configured to determine that at least one of the at least one motor is reversed relative to the intended motor orientation if the deflection is in a second direction opposite the first direction.

17. The system of claim 15, wherein:
the at least one motor comprises a pair of motors,
the circuitry is configured to determine that the orientation of both motors of the pair match the intended motor orientation if the deflection is in a first direction, and
the circuitry is configured to determine that both motors of the pair are in a mutual reverse polarity condition relative to the intended motor orientation if the deflection is in a second direction opposite the first direction.

18. The system of claim 14, wherein:
the at least one motor comprises a pair of motors,
the characteristic of the electrical signal is a polarity of a deflection of the electrical signal that is a combined output by both motors of the pair, and
the circuitry is configured to determine that the orientation of one motor of the pair is reversed relative to the intended motor orientation if the magnitude of the deflection is less than a threshold.

19. The system of claim 14, wherein:
the device comprises a vibration element to which a control signal is delivered to cause the second portion to move relative to the first portion, and
the characteristic of the electrical signal is a phase offset between the control signal and the electrical signal.

20. The system of claim 19, wherein:
the at least one motor comprises a pair of motors,
the circuitry is configured to compare the phase offset to a threshold,
the circuitry is configured to determine that the orientation of the at least one motor is proper relative to the intended motor orientation if the phase offset is less than the threshold, and
the circuitry is configured to determine that the orientation of one motor of the pair is reversed relative to the intended motor orientation if the phase offset is greater than the threshold.

21. The system of claim 19, wherein the at least one motor comprises a pair of motors, and the control circuitry is configured to determine that the pair of motors are in a mutual reverse polarity condition relative to the intended motor orientation if the phase offset is approximately 180 degrees.

22. The system of claim 14, wherein:
the device comprises a vibration element to which a control signal is delivered to cause the second portion to move relative to the first portion, and
the characteristic of the electrical signal is a gain value calculated between the control signal and the electrical signal.

* * * * *